United States Patent
Zhao et al.

(10) Patent No.: US 11,690,044 B2
(45) Date of Patent: Jun. 27, 2023

(54) METHOD AND DEVICE FOR SELECTING RESOURCES IN CARRIER WAVE

(71) Applicant: China Academy of Telecommunications Technology, Beijing (CN)

(72) Inventors: Li Zhao, Beijing (CN); Rui Zhao, Beijing (CN); Chenxin Li, Beijing (CN); Ying Peng, Beijing (CN); Jiayi Fang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 214 days.

(21) Appl. No.: 16/982,595

(22) PCT Filed: Feb. 14, 2019

(86) PCT No.: PCT/CN2019/075065
§ 371 (c)(1),
(2) Date: Sep. 21, 2020

(87) PCT Pub. No.: WO2019/179260
PCT Pub. Date: Sep. 26, 2019

(65) Prior Publication Data
US 2021/0377911 A1 Dec. 2, 2021

(30) Foreign Application Priority Data
Mar. 20, 2018 (CN) .......................... 201810230789.8

(51) Int. Cl.
*H04W 72/02* (2009.01)
*H04W 72/0453* (2023.01)
(Continued)

(52) U.S. Cl.
CPC ....... *H04W 72/02* (2013.01); *H04W 72/0453* (2013.01); *H04W 72/20* (2023.01); *H04W 92/18* (2013.01)

(58) Field of Classification Search
CPC ............. H04W 72/02; H04W 72/0406; H04W 72/0453; H04W 92/18
See application file for complete search history.

(56) References Cited

U.S. PATENT DOCUMENTS

2017/0303260 A1\* 10/2017 Peng ................. H04W 56/0025
2018/0063816 A1    3/2018 Gulati et al.
(Continued)

FOREIGN PATENT DOCUMENTS

CN         104955017 A      9/2015
CN         105101427 A     11/2015
(Continued)

OTHER PUBLICATIONS

Intel Corporation, "Sidelink Carrier Aggregation for Mode-4 LTE V2V Communication", 3GPP TSG RAN WG1 Meeting #90, Prague, Czech Republic Aug. 21-25, 2017, total 8 pages, R1-1712481.
(Continued)

*Primary Examiner* — Pao Sinkantarakorn
*Assistant Examiner* — Kabir U Jahangir
(74) *Attorney, Agent, or Firm* — Kilpatrick Townsend & Stockton, LLP

(57) ABSTRACT

Disclosed by the present application are a method and device for selecting resources in a carrier wave, the method includes that according to the service requirements for a service to be sent, determining available resources in a carrier wave that supports the service to be sent that satisfy the service requirements; and forming a resource pool by
(Continued)

means of the available resources; and selecting from the resource pool a target resource that is used to send the service to be sent.

11 Claims, 1 Drawing Sheet

(51) Int. Cl.
*H04W 72/20* (2023.01)
*H04W 92/18* (2009.01)

(56) References Cited

U.S. PATENT DOCUMENTS

| | | | |
|---|---|---|---|
| 2018/0124707 A1* | 5/2018 | Lee | H04W 72/0406 |
| 2019/0045465 A1* | 2/2019 | Lee | H04W 92/18 |
| 2020/0008030 A1* | 1/2020 | Kim | H04L 5/003 |
| 2020/0280961 A1* | 9/2020 | Lee | H04W 72/02 |
| 2020/0296690 A1* | 9/2020 | Lee | H04W 72/02 |
| 2021/0007073 A1* | 1/2021 | Lee | H04W 72/08 |

FOREIGN PATENT DOCUMENTS

| | | |
|---|---|---|
| CN | 107040997 A | 8/2017 |
| CN | 107371182 A | 11/2017 |
| WO | 2017076954 A1 | 5/2017 |
| WO | 2018030938 A1 | 2/2018 |
| WO | 2018031086 A1 | 2/2018 |

OTHER PUBLICATIONS

Astri et al.,"Resource selection for V2X systems supporting CA", 3GPP TSG RAN WG1 Meeting 90bis, Prague, CZ, Oct. 9-13, 2017, total 5 pages, R1-1717415.
CATT,"Discussion on carrier aggregation for mode 4 in V2X Phase 2", 3GPP TSG RAN WG1 Meeting #91, Reno, USA, Nov. 27-Dec. 1, 2017, total 8 pages, R1-1720158.
CATT,"Discussion on latency reduction between packet arrival and resource selection", 3GPP TSG RAN WG1 Meeting #92, Athens, Greece, Feb. 26-Mar. 2, 2018, total 4 pages, R1-1801707.
Panasonic,"Discussion on resource selection in mode 4 CA", 3GPP TSG RAN WG1 Meeting #92, Athens, Greece, Feb. 26-Mar. 2, 2018, total 3 pages, R1-1802443.
OPPO,"Carrier selection in CA-based eV2x", 3GPP TSG-RAN2 Meeting #101, Athens, Greece, Feb. 26-Mar. 2, 2018, total 4 pages, R2-1801852.

* cited by examiner

METHOD AND DEVICE FOR SELECTING RESOURCES IN CARRIER WAVE

This application claims priority of Chinese Patent Application No. 201810230789.8, filed with the China National Intellectual Property Administration (CNIPA) on Mar. 20, 2018 and entitled "Method and Device for Selecting Resources in Carrier Wave", the entire content of which is incorporated herein by reference.

FIELD

The present application relates to the field of communication technologies and particularly to a method and device for selecting resources in a carrier.

BACKGROUND

At present, in the LTE (Long Term Evolution) V2X (Vehicle to Everything), the resource configuration information on multiple carriers can be provided through the dedicated signaling, System Information Block (SIB) 21 and pre-configuration mode, and the serving cell can instruct the UE to obtain the resource configuration information.

The protocol TS 36.300 only specifies that the transmissions can be performed in multiple carriers at the same time if a UE (User Equipment) supports multiple transmission chains. However, there is no solution of how to select resources in the carrier that supports the UE's service to be sent.

BRIEF SUMMARY

Embodiments of the present application provide a method and device for selecting resources in a carrier, so as to solve the technical problem that there is no solution of how to select resources in the carrier that supports the UE's service to be sent.

To this end, in a first aspect, embodiments of the present application provide a method for selecting resources in a carrier, including:

determining, according to a service requirement for a service to be sent, available resources meeting the service requirement in a carrier supporting the service to be sent, and forming a resource pool from the available resources; and selecting target resources for sending the service to be sent from the resource pool.

In some embodiments of the present application, the available resources meeting the service requirement for the service to be sent are selected from the carrier supporting the service to be sent according to the service requirement for the service to be sent, and a resource pool is formed from the selected available resources, and then the target resources for sending the service to be sent are selected from the resource pool, so the technical problem that there is no solution of how to select resources in the carrier that supports the UE's service to be sent is effectively solved, and a solution to select resources in the carrier that supports the UE's service to be sent is provided.

Optionally, the selecting target resources for sending the service to be sent from the resource pool, includes:

determining candidate resources that are not occupied by other services in the resource pool; and taking the candidate resources as the target resources for sending the service to be sent when a proportion of the candidate resources in the resource pool is greater than or equal to a preset value.

The above optional mode describes that some embodiments of the present application may also firstly determine the candidate resources that are not occupied by other services from the formed resource pool, and compare whether the proportion of the determined candidate resources to all the resources in the resource pool is greater than or equal to the preset value. When the proportion of the candidate resources to all the resources in the resource pool is greater than or equal to the preset value, it indicates that the number of determined candidate resources is large enough to ensure the randomness of the resource selection for the service to be sent by the terminal, so there is the technical effect of ensuring the randomness of the resource selection for the service to be sent and reducing the resource collision.

Optionally, the determining candidate resources that are not occupied by other services in the resource pool, includes:

determining candidate resources in the resource pool, wherein the candidate resources include resources that are not indicated by control information SA (Sidelink Assignment) to be occupied and receive receipt signal power of a PSSCH (Physical Sidelink Share Channel) less than a receipt signal power threshold of the PSSCH configured for a carrier where the candidate resources are located.

Optionally, when the proportion of the candidate resources in the resource pool is less than the preset value, the method includes:

increasing the receipt signal power threshold according to a preset power increment, and re-determining candidate resources every time the receipt signal power threshold is increased, until a proportion of the re-determined candidate resources in the resource pool is greater than or equal to the preset value.

The above optional mode describes that, in some embodiments of the present application, when the proportion of the candidate resources to all the resources in the resource pool is less than the preset value, the receipt signal power threshold is increased according to the preset power increment, and the candidate resources are re-determined every time the receipt signal power threshold is increased, until the proportion of the re-determined candidate resources in the resource pool is greater than or equal to the preset value, thus further ensuring the technical effect of the randomness of the resource selection for the service to be sent and reducing the resource collision.

Optionally, the service requirement includes at least one of:

the size of resources that the service to be sent needs to occupy, or the resource period required by the service to be sent.

Optionally, the taking the candidate resources as the target resources, includes:

determining the candidate resources as the target resources; and sending the target resources to a high-layer signaling, so that the high-layer signaling performs resource selection in the target resources for the service to be sent.

Optionally, before determining the available resources meeting the service requirement in the carrier supporting the service to be sent, the method includes:

determining at least one carrier corresponding to the type of the service to be sent according to a correspondence between service types and carriers configured by a high-layer signaling, wherein the at least one carrier is the carrier supporting the service to be sent.

In a second aspect, embodiments of the present application further provides a device for selecting resources in a carrier, including:

a determining device configured to determine, according to a service requirement for a service to be sent, available resources meeting the service requirement in a carrier supporting the service to be sent, and form a resource pool from the available resources; and a selection device configured to select target resources for sending the service to be sent from the resource pool.

Optionally, the selection device is configured to:

determine candidate resources that are not occupied by other services in the resource pool; and take the candidate resources as the target resources for sending the service to be sent when a proportion of the candidate resources in the resource pool is greater than or equal to a preset value.

Optionally, the selection device is configured to:

determine candidate resources in the resource pool, wherein the candidate resources include resources that are not indicated by control information SA to be occupied and receive receipt signal power of a PSSCH less than a receipt signal power threshold of the PSSCH configured for a carrier where the candidate resources are located.

Optionally, the selection device is further configured to:

increase the receipt signal power threshold according to a preset power increment, and re-determine candidate resources every time the receipt signal power threshold is increased, until a proportion of the re-determined candidate resources in the resource pool is greater than or equal to the preset value.

Optionally, the service requirement includes at least one of:

the size of resources that the service to be sent needs to occupy, or the resource period required by the service to be sent.

Optionally, the selection device is further configured to:

determine the candidate resources as the target resources; and send the target resources to a high-layer signaling, so that the high-layer signaling performs resource selection in the target resources for the service to be sent.

Optionally, the determining device is further configured to:

determine at least one carrier corresponding to the type of the service to be sent according to a correspondence between service types and carriers configured by a high-layer signaling, wherein the at least one carrier is the carrier supporting the service to be sent.

In a third aspect, embodiments of the present application further provides a device for selecting resources in a carrier, including:

at least one processor, and a memory connected to the at least one processor;

wherein the memory stores instructions that can be executed by the at least one processor, and the at least one processor performs the method described in the first aspect by executing the instructions stored in the memory.

In a fourth aspect, an embodiment of the present application further provides a readable storage medium storing a computer program thereon, the computer program is executed by a processor to implement the method described in the first aspect.

The one or more above-mentioned technical solutions in the embodiments of the present application have at least one or more technical effects as follows.

In the technical solution in the embodiments of the present application, the available resources meeting the service requirement for the service to be sent are selected from the carrier supporting the service to be sent according to the service requirement for the service to be sent, and a resource pool is formed from the selected available resources, and then the target resources for sending the service to be sent are selected from the resource pool, so the technical problem that there is no solution of how to select resources in the carrier that supports the UE's service to be sent is effectively solved, and a solution to select resources in the carrier that supports the UE's service to be sent is provided.

BRIEF DESCRIPTION OF THE DRAWINGS

In order to illustrate the technical solutions in the embodiments of the present application or in the prior art more clearly, the accompanying figures which need to be used in describing the embodiments will be introduced below briefly. Obviously the accompanying figures described below are only some embodiments of the present application.

DETAILED DESCRIPTION OF THE EMBODIMENTS

In order to make the purposes, technical solutions and advantages of the embodiments of the present application clearer, the technical solution of the present application will be described clearly and completely below in combination with the accompanying drawings in the embodiments of the present application. Obviously the described embodiments are a part of the embodiments of the technical solution of the present application but not all the embodiments. Based upon the embodiments recorded in the present application document, all of other embodiments obtained by those ordinary skilled in the art without creative work pertain to the protection scope of the technical solution of the present application.

Figure 1:
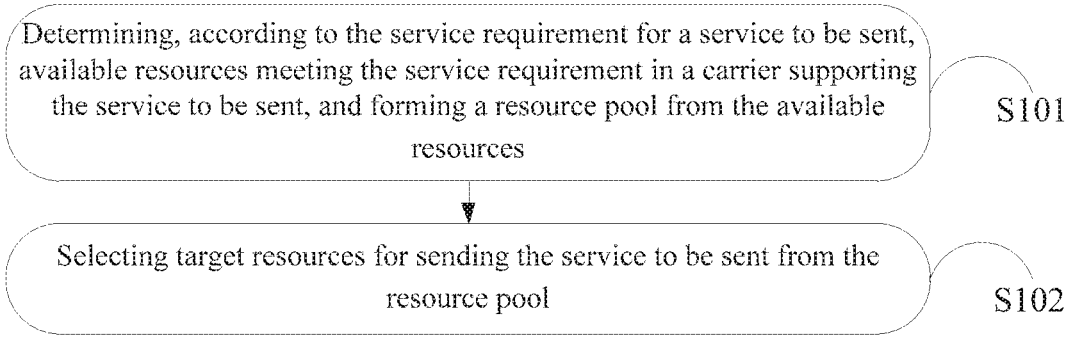
FIG. 1 is a flowchart of a method for selecting resources in a carrier provided by an embodiment of the present application.

Referring to FIG. 1, a method for selecting resources in a carrier provided by some embodiments of the present application includes:

Step S101: determining, according to a service requirement for a service to be sent, available resources meeting the service requirement in a carrier supporting the service to be sent, and forming a resource pool from the available resources.

Step S102: selecting target resources for sending the service to be sent from the resource pool.

In some embodiments of the present application, the terminal may select the available resources meeting the service requirement for the service to be sent from the carrier supporting the service to be sent according to the service requirement for the service to be sent, and form a resource pool from the selected available resources, and then select the target resources for sending the service to be sent from the resource pool, so a solution to select resources in the carrier that supports the UE's service to be sent is provided.

Optionally, before performing the above step S101, the method in some embodiments of the present application may further include: determining at least one carrier corresponding to the type of the service to be sent according to the correspondence between service types and carriers configured by the high-layer signaling, where the at least one carrier is the carrier supporting the service to be sent.

That is, the terminal may firstly determine at least one carrier corresponding to the service type of the service to be sent according to the correspondence between service types and carriers configured by the high-layer signaling. The above service type may be specifically the priority of the service or the transmission rate of the service, or may be the category to which the service belongs, such as video, image, voice, etc., which will not be listed here.

For example, when the service type is the priority of the service, it is assumed that the system includes carrier C1, carrier C2 and carrier C3, and it is assumed that the correspondence between service priorities and carriers configured by the high-level signaling is: the service priorities PPPP (ProSe Per-Packet Priority) supported by the carrier C1 are 5 and 6, the service priorities PPPP supported by the carrier C2 are 4 and 5, and the service priorities PPPP supported by the carrier C3 are 7 and 6.

It is assumed that the service priority PPPP of the service to be sent by the terminal is 5, then it can be determined, according to the correspondence between service priorities and carriers configured by the high-level signaling as described above, that the carriers corresponding to the service priority PPPP being 5 of the service to be sent includes the carrier C1 and carrier C2, that is, the carrier C1 and carrier C2 are the carriers supporting the service to be sent in the terminal; if it is assumed that the service priority PPPP of the service to be sent by the terminal is 4, then it can be determined, according to the above correspondence, that the carrier corresponding to the service priority PPPP being 4 of the service to be sent in the terminal is the carrier C2, that is, the carrier C2 is the carrier supporting the service to be sent in the terminal.

For another example, the service type is the category to which the service belongs, wherein the categories to which services belong include video, image and voice. When it is assumed that the system includes carrier C1, carrier C2 and carrier C3, and it is assumed that the correspondence between categories to which services belong and carriers configured by the high-level signaling is: the carrier C1 supports video services, the carrier C2 supports image services, and the carrier C3 supports both voice services and video services.

Then, when it is assumed that the service category of the service to be sent by the terminal is image, then it can be determined, according to the correspondence between categories to which services belong and carriers configured by the high-level signaling as described above, that the carrier corresponding to the service category of the service to be sent in the terminal is the carrier C2, that is, the carrier C2 is the carrier supporting the service to be sent in the terminal; if it is assumed that the service category of the service to be sent by the terminal is video, then it can be determined, according to the above correspondence, that the carrier C1 and carrier C3 are the carriers supporting the service to be sent in the terminal.

In some embodiments of the present application, as an example, the service type is the priority of the service; the system includes carrier C1, carrier C2 and carrier C3; the correspondence between service priorities and carriers configured by the high-level signaling is: the service priorities PPPP supported by the carrier C1 are 5 and 6, the service priorities PPPP supported by the carrier C2 are 4 and 5, and the service priorities PPPP supported by the carrier C3 are 7 and 6; and the service priority PPPP of the service to be sent by the terminal is 5. Then, according to the correspondence between service priorities and carriers configured by the high-level signaling, the carrier C1 and carrier C2 are determined as the carriers supporting the service to be sent in the terminal.

In practical applications, a candidate carrier set may also be set, and the determined carrier C1 and carrier C2 that support the service to be sent by the terminal are added to the candidate carrier set.

Optionally, the service requirement includes: the size of resources that the service to be sent needs to occupy, and/or the resource period required by the service to be sent.

In the method in some embodiments of the present application, when performing the step S101, the terminal may select the available resources meeting the size of resources that the service to be sent needs to occupy from the carrier(s) supporting the service to be sent according to the size of resources that the service to be sent needs to occupy; the terminal may also select the available resources meeting the resource period required by the service to be sent from the carrier(s) supporting the service to be sent according to the resource period required by the service to be sent; the terminal may also select the available resources meeting both the size of resources that the service to be sent needs to occupy and the resource period required by the service to be sent from the carrier(s) supporting the service to be sent according to both the size of resources that the service to be sent needs to occupy and the resource period required by the service to be sent.

In some embodiments of the present application, as an example, the terminal selects the available resources meeting both the size of resources that the service to be sent needs to occupy and the resource period required by the service to be sent from the carrier(s) supporting the service to be sent according to both the size of resources that the service to be sent needs to occupy and the resource period required by the service to be sent.

For example, it is assumed that the size of resources that the service to be sent by the terminal needs to occupy is 5 sub-channels, the required resource period is 100 ms and a single subframe in the system supports 10 sub-channels, and it is assumed that there is only one resource pool in the carrier C1 supporting the service to be sent, and a total of 100 sub-channels within 100 ms meet the sending requirement of the service to be sent (that is, not only meet the size of resources that the service to be sent needs to occupy, but also meet the resource period required by the service to be sent); and it is assumed that there are two resource pools in the carrier C2 but only one resource pool meets the sending requirement, and a total of 90 sub-channels in the resource pool within 100 ms meet the sending requirement of the service to be sent.

Then, the terminal can determine a total of 190 available resources from the carrier C1 and carrier C2 according to the sending requirement that the size of resources that the service to be sent needs to occupy is 5 sub-channels and the required resource period is 100 ms, and these 190 available resources form a resource pool.

Optionally, the step S102 in some embodiments of the present application may also be implemented in the following way.

Step A: determining candidate resources that are not occupied by other services in the resource pool.

Step B: taking the candidate resource as the target resources for sending the service to be sent if the proportion of the candidate resources in the resource pool is greater than or equal to a preset value.

In some embodiments of the present application, the terminal may use the sensing mechanism of LTE V2X many times, and use the sensing window length of 1 s to obtain the service sending situation in other nodes, and then monitor the resource occupation situation of the 190 available resources in the above resource pool according to the obtained service sending situation in other nodes.

Optionally, the above step A may include: determining candidate resources in the resource pool, where the candidate resources include resources that are not indicated by the control information SA to be occupied and receive the receipt signal power of a PSSCH less than the receipt signal power threshold of the PSSCH configured for a carrier where the candidate resources are located.

That is, the terminal may select the resources that are not indicated by the SA to be occupied and receive the receipt signal power of the PSSCH (i.e., PSSCH-RSRP (Physical Sidelink Share Channel-Reference Signal Receiving Power)) less than the receipt signal power threshold of the PSSCH configured for the carrier where the candidate resources are located as the candidate resources from the resource pool according to the resource occupation situation of the 190 available resources in the resource pool described above, where the candidate resources are resources that are not occupied by other services.

In actual applications, if the resources in the resource pool are not monitored by sensing, the candidate resources may be determined by judging whether there is a possibility of collision with other services (periodical resource collision) in the mapping of the counter to the future (i.e., in a given time period in the future).

In practical applications, the receipt signal power threshold of the PSSCH may be specifically configured for the carrier where the candidate resources are located according to the receiving priority and the sending priority. Of course, the receipt signal power threshold of the PSSCH may also be configured for the carrier where the candidate resources are located according to other indexes, which are not listed here.

In some embodiments of the present application, in addition to meeting the condition of being not indicated by the SA to be occupied and receiving the receipt signal power of the PSSCH less than the receipt signal power threshold of the PSSCH configured for the carrier where the candidate resources are located, the determined candidate resources may further be set to meet the condition that there is no possibility of resource collision with other sending nodes (other services) in a given time period in the future.

In some embodiments of the present application, a threshold may also be preset. When the proportion of the determined candidate resources to all the available resources in the resource pool is greater than or equal to the threshold, it indicates that the number of determined candidate resources is large enough to ensure the randomness of the resource selection for the service to be sent by the terminal, so the candidate resources can be taken as the target resources for the sending terminal.

Optionally, the using of the candidate resources as the target resources sending the service to be sent is: determining the candidate resources as the target resources, and sending the target resources to a high-layer signaling, so that the high-layer signaling performs the resource selection in the target resources for the service to be sent.

That is, when the proportion of the determined candidate resources to all the available resources in the resource pool is greater than or equal to the preset threshold, it indicates that the number of determined candidate resources is large enough to ensure the randomness of the resource selection for the service to be sent by the terminal, so the candidate resources are taked as the target resources and the target resources are sent to the high-layer signaling, so that the high-layer signaling performs the resource selection in the target resources for the service to be sent by the terminal.

For example, the preset threshold is 20%, and it is assumed that the number of candidate resources determined in the resource pool that are not indicated by the control information SA to be occupied and receive the receipt signal power of the PSSCH less than the receipt signal power threshold of the PSSCH configured for the carrier where the candidate resources are located is 35, these 35 candidate resources include 18 candidate resources belonging to the carrier C1 and 17 candidate resources belonging to the carrier C2, the proportion of the 35 candidate resources to all the resources in the resource pool is: 35/150, that is, 23%. Then, this ratio is greater than the threshold of 20%, and the determined 35 candidate resources described above can be taken as target resources and sent to the higher-level signaling for performing the resource selection for the service to be sent.

When the proportion of the determined candidate resources to all the available resources in the resource pool is less than the preset threshold, it is possible to increase the receipt signal power threshold of the PSSCH configured for the carrier where the candidate resources are located according to a preset power increment, and re-determine candidate resources every time the receipt signal power threshold is increased, until the proportion of the re-determined candidate resources in the resource pool is greater than or equal to the preset value.

For example, it is also assumed here that the preset threshold is 20%, and it is assumed that the number of candidate resources determined in the resource pool that are not indicated by the control information SA to be occupied and receive the receipt signal power of the PSSCH less than the receipt signal power threshold of the PSSCH configured for the carrier where the candidate resources are located is 18, these 18 candidate resources include 10 candidate resources belonging to the carrier C1 and 8 candidate resources belonging to the carrier C2, the proportion of the 18 candidate resources to all the resources in the resource pool is: 18/150, that is, 12%. Then, this ratio is less than the preset threshold of 20%.

At this time, the receipt signal power threshold of the PSSCH configured for the carrier C1 may be increased and the receipt signal power threshold of the PSSCH configured for the carrier C2 may be increased according to the preset power increment such as 3 dB. The candidate resources are re-determined every time the thresholds are increased. It is assumed here that the receipt signal power threshold of the PSSCH configured for the carrier C1 is increased for the first time according to the power increment of 3 dB (for ease of description, hereinafter referred to as receipt signal power threshold of the carrier C1 after the first increase), and the receipt signal power threshold of the PSSCH configured for the carrier C2 is increased for the first time according to the power increment of 3 dB.

After the first increase, if the number of candidate resources in the carrier C1 determined from the resource pool that are not indicated by the control information SA to be occupied and receive the receipt signal power of the PSSCH less than the receipt signal power threshold of the carrier C1 after the first increase becomes 12, and the number of determined candidate resources in the carrier C2 that are not indicated by the control information SA to be occupied and receive the receipt signal power of the PSSCH less than the receipt signal power threshold of the carrier C2 after the first increase becomes 11, the total number of candidate resources is 23. The proportion of these 23 candidate resources to all the resources in the resource pool is: 23/150, that is, 15.3%, and this ratio is still less than the preset threshold of 20%. At this time, the receipt signal power threshold of the PSSCH configured for the carrier C1 continues being increased for the second time according to the preset power increment of 3 dB, and the receipt signal power threshold of the PSSCH configured for the carrier C2 continues being increased for the second time according to the power increment of 3 dB.

After the second increase, if the number of candidate resources in the carrier C1 determined from the resource pool that are not indicated by the control information SA to be occupied and receive the receipt signal power of the PSSCH less than the receipt signal power threshold of the carrier C1 after the second increase becomes 20, and the number of determined candidate resources in the carrier C2 that are not indicated by the control information SA to be occupied and receive the receipt signal power of the PSSCH less than the receipt signal power threshold of the carrier C2 after the second increase becomes 19, the total number of candidate resources is 39. The proportion of these 39 candidate resources to all the resources in the resource pool is: 39/150, that is, 26%, which is greater than the threshold of 20%. At this time, the 39 candidate resources described above can be taken as target resources and sent to the higher-level signaling for performing the resource selection for the service to be sent.

Therefore, with the above method, in some embodiments of the present application, when the proportion of the candidate resources to all the resources in the resource pool is greater than or equal to the preset value, it indicates that the number of determined candidate resources is large enough and the candidate resources are taken as target resources and sent to the higher-level signaling for performing the resource selection for the service to be sent; and when the proportion of the candidate resources to all the resources in the resource pool is less than the preset value, the receipt signal power threshold is increased according to the preset power increment, and the candidate resources are re-determined every time the receipt signal power threshold is increased, until the proportion of the re-determined candidate resources in the resource pool is greater than or equal to the preset value, thus ensuring the technical effect of the randomness of the resource selection for the service to be sent and reducing the resource collision.

Figure 2:
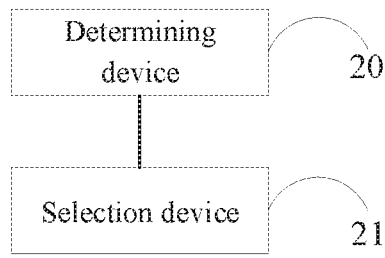
FIG. 2 is a structural schematic diagram of a device for selecting resources in a carrier provided by an embodiment of the present application.

Based on the same inventive concept, some embodiments of the present application provide a device for selecting resources in a carrier, which is suitable for a user equipment. The specific implementations of the method for selecting resources in the carrier of the device can refer to the description of the above method embodiments, and the repeated description thereof will be omitted here. Referring to FIG. 2, the device includes:

a determining device 20 configured to determine, according to the service requirement for a service to be sent, available resources meeting the service requirement in a carrier supporting the service to be sent, and form a resource pool from the available resources;

a selection device 21 configured to select target resources for sending the service to be sent from the resource pool.

Optionally, the selection device 21 is configured to:

determine candidate resources that are not occupied by other services in the resource pool;

take the candidate resources as the target resources for sending the service to be sent if the proportion of the candidate resources in the resource pool is greater than or equal to a preset value.

Optionally, the selection device 21 is configured to:

determine candidate resources in the resource pool, wherein the candidate resources include resources that are not indicated by the control information SA to be occupied and receive the receipt signal power of a PSSCH less than the receipt signal power threshold of the PSSCH configured for a carrier where the candidate resources are located.

Optionally, the selection device 21 is further configured to:

increase the receipt signal power threshold according to a preset power increment, and re-determine candidate resources every time the receipt signal power threshold is increased, until a proportion of the re-determined candidate resources in the resource pool is greater than or equal to the preset value.

Optionally, the service requirement includes at least one of:

the size of resources that the service to be sent needs to occupy, or the resource period required by the service to be sent.

Optionally, the selection device 21 is further configured to:

determine the candidate resources as the target resources;

send the target resources to a high-layer signaling, so that the high-layer signaling performs the resource selection in the target resources for the service to be sent.

Optionally, the determining device 20 is further configured to:

determine at least one carrier corresponding to the type of the service to be sent according to the correspondence between service types and carriers configured by a high-layer signaling, wherein the at least one carrier is the carrier supporting the service to be sent.

Figure 3:
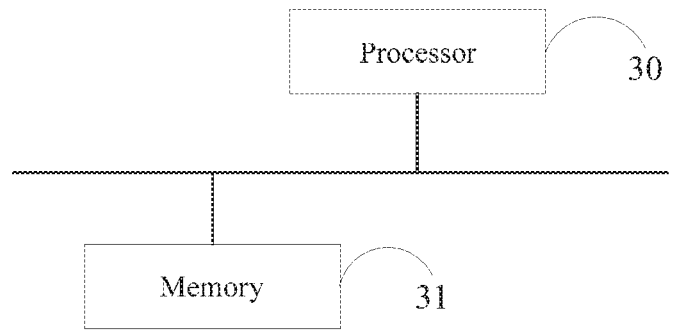
FIG. 3 is a structural schematic diagram of another device for selecting resources in a carrier provided by an embodiment of the present application.

Based on the same inventive concept, some embodiments of the present application provides a device for selecting resources in a carrier, which is suitable for a user equipment. Referring to FIG. 3, the device includes:

at least one processor 30, and a memory 31 connected to the at least one processor 30;

wherein the memory 31 stores instructions that can be executed by the at least one processor 30, and the at least one processor 30 performs the method for selecting resources in the carrier as described above by executing the instructions stored in the memory 31.

Specifically, some embodiments of the present application provide a device for selecting resources in a carrier, which is suitable for a user equipment. Referring to FIG. 3, the device includes:

a memory 31 configured to store program instructions;

a processor 30 configured to invoke the program instructions stored in the memory 31, and in accordance with the obtained program, perform the process of:

determining, according to the service requirement for a service to be sent, available resources meeting the service requirement in a carrier supporting the service to be sent, and forming a resource pool from the available resources;

selecting target resources for sending the service to be sent from the resource pool.

Here, the bus architecture may include any numbers of interconnected buses and bridges, and specifically link various circuits of one or more processors represented by the processor 30 and memory(s) represented by the memory 31. The bus architecture may further link various other circuits such as peripheral device, voltage regulator and power management circuit, which are all well known in the art and thus will not be further described again herein. The bus interface provides an interface. The transceiver may be a plurality of elements, i.e., include a transmitter and a receiver, and provide the devices for communicating with various other devices over the transmission media. For different user equipments, the user interface can also be the interface capable of inter-connecting or exter-connecting with the required devices, and the connected devices include but not limited to keypad, display, loudspeaker, microphone, joystick and the like.

The processor 30 is responsible for managing the bus architecture and general processing, and the memory 31 may store the data used by the processor 30 when performing the operations.

The processor 30 is responsible for managing the bus and the general processing, and can further provide various functions including timing, peripheral interface, voltage regulation, power management and other control functions. The memory 31 may be used to store the data used by the processor 30 when performing the operations.

Optionally, the processor 30 may be Central Processing Device (CPU), Application Specific Integrated Circuit (ASIC), Field-Programmable Gate Array (FPGA) or Complex Programmable Logic Device (CPLD).

The user equipment may also referred to as terminal, Mobile Station ("MS" for short), Mobile Terminal or the like. Optionally, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

Based on the same inventive concept, some embodiments of the present application provide a readable storage medium storing a computer program thereon, where the computer program implement the steps of the method for selecting resources in the carrier as described above when executed by a processor.

The readable storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

It should be understood by those skilled in the art that the embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the present application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the embodiments of the present application without departing from the spirit and scope of the embodiments of the present application. Thus the present application is also intended to encompass these modifications and variations therein as long as these modifications and variations to the embodiments of the present application come into the scope of the claims of the present application and their equivalents.

What is claimed is:

1. A method for selecting resources in a carrier, comprising:

determining, according to a service requirement for a service to be sent, available resources meeting the service requirement in a carrier supporting the service to be sent, and forming a resource pool from the available resources; and selecting target resources for sending the service to be sent from the resource pool;

wherein the selecting target resources for sending the service to be sent from the resource pool comprises:

determining candidate resources that are not occupied by other services in the resource pool; and taking the candidate resources as the target resources for sending the service to be sent when a proportion of the candidate resources in the resource pool is greater than or equal to a preset value;

wherein the determining candidate resources that are not occupied by other services in the resource pool comprises:

determining candidate resources in the resource pool, wherein the candidate resources comprise resources that are not indicated by control information Sidelink Assignment, SA, to be occupied and receive receipt signal power of a Physical Sidelink Share Channel, PSSCH, less than a receipt signal power threshold of the PSSCH configured for a carrier where the candidate resources are located.

2. The method of claim 1, wherein when the proportion of the candidate resources in the resource pool is less than the preset value, the method further comprises:

increasing the receipt signal power threshold according to a preset power increment, and re-determining candidate resources every time the receipt signal power threshold is increased, until a proportion of the re-determined candidate resources in the resource pool is greater than or equal to the preset value.

3. The method of claim 1, wherein the service requirement comprises:

a size of resources that the service to be sent needs to occupy; and/or a resource period required by the service to be sent.

4. The method of claim 1, wherein the taking the candidate resources as the target resources comprises:

determining the candidate resources as the target resources; and sending the target resources to a high-layer signaling, so that the high-layer signaling performs resource selection in the target resources for the service to be sent.

5. The method of claim 1, wherein before determining the available resources meeting the service requirement in the carrier supporting the service to be sent, the method further comprises:

determining at least one carrier corresponding to a type of the service to be sent according to a correspondence between service types and carriers configured by a high-layer signaling, wherein the at least one carrier is the carrier supporting the service to be sent.

6. A non-volatile computer readable storage medium storing a computer program thereon, wherein the computer program is executed by a processor to implement the method of claim 1.

7. A device for selecting resources in a carrier, comprising:

at least one processor, and a memory connected to the at least one processor;

wherein the memory stores instructions that can be executed by the at least one processor, and the at least one processor executing the instructions stored in the memory is configured for:

determining, according to a service requirement for a service to be sent, available resources meeting the service requirement in a carrier supporting the service to be sent, and forming a resource pool from the available resources; and selecting target resources for sending the service to be sent from the resource pool;

wherein the at least one processor executing the instructions stored in the memory is further configured for:

determining candidate resources that are not occupied by other services in the resource pool; and taking the candidate resources as the target resources for sending the service to be sent when a proportion of the candidate resources in the resource pool is greater than or equal to a preset value;

wherein the at least one processor executing the instructions stored in the memory is further configured for:

determining candidate resources in the resource pool, wherein the candidate resources comprise resources that are not indicated by control information Sidelink Assignment, SA, to be occupied and receive receipt signal power of a Physical Sidelink Share Channel, PSSCH, less than a receipt signal power threshold of the PSSCH configured for a carrier where the candidate resources are located.

8. The device of claim 7, wherein when the proportion of the candidate resources in the resource pool is less than the preset value, the at least one processor executing the instructions stored in the memory is further configured for:

increasing the receipt signal power threshold according to a preset power increment, and re-determining candidate resources every time the receipt signal power threshold is increased, until a proportion of the re-determined candidate resources in the resource pool is greater than or equal to the preset value.

9. The device of claim 7, wherein the service requirement comprises:

a size of resources that the service to be sent needs to occupy; and/or a resource period required by the service to be sent.

10. The device of claim 7, wherein the at least one processor executing the instructions stored in the memory is further configured for:

determining the candidate resources as the target resources; and sending the target resources to a high-layer signaling, so that the high-layer signaling performs resource selection in the target resources for the service to be sent.

11. The device of claim 7, wherein the at least one processor executing the instructions stored in the memory is further configured for: before determining the available resources meeting the service requirement in the carrier supporting the service to be sent, determining at least one carrier corresponding to a type of the service to be sent according to a correspondence between service types and carriers configured by a high-layer signaling, wherein the at least one carrier is the carrier supporting the service to be sent.

* * * * *